United States Patent [19]

Conley

[11] Patent Number: 5,151,778
[45] Date of Patent: Sep. 29, 1992

[54] EYEGLASS CASE AND RETAINER

[76] Inventor: Paul Conley, N30 W29101 Hillcrest Dr., Pewaukee, Wis. 53072

[21] Appl. No.: 763,953

[22] Filed: Sep. 23, 1991

[51] Int. Cl.⁵ .......................... G02C 3/00; A45C 11/04
[52] U.S. Cl. .................................... 351/156; 351/157; 206/5; 224/181; 2/452
[58] Field of Search ....................... 351/156, 157, 155; 206/5; 224/181, 151; 2/452, 454, 442, 13

[56] References Cited

U.S. PATENT DOCUMENTS

| | | | |
|---|---|---|---|
| 2,758,309 | 8/1956 | Baratelli | 2/452 |
| 4,606,453 | 8/1986 | Burns | 2/13 X |
| 5,014,846 | 5/1991 | Walker et al. | 351/156 X |
| 5,032,018 | 7/1991 | McCulley et al. | 351/156 |
| 5,046,200 | 9/1991 | Fieder | 351/156 X |
| 5,052,550 | 10/1991 | Pfenning | 206/5 |

Primary Examiner—Eugene R. LaRoche
Assistant Examiner—D. Hyum Yoo
Attorney, Agent, or Firm—Andrus, Sceales, Starke & Sawall

[57] ABSTRACT

A case for holding eyeglasses defines the head band of an eyeglass retainer. The bow retaining straps of the retainer are secured to the outer edges of the case/head band. A separate, flexible sheet conforms to the shape of and is secured to the head band case for defining a pocket between the base and the sheet. A through slot in the sheet provides access to the pocket, permitting the folded eyeglasses to be inserted through the slot and encased between the base and the sheet while attached to the retaining straps.

17 Claims, 2 Drawing Sheets

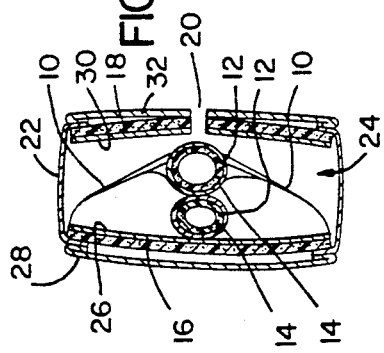
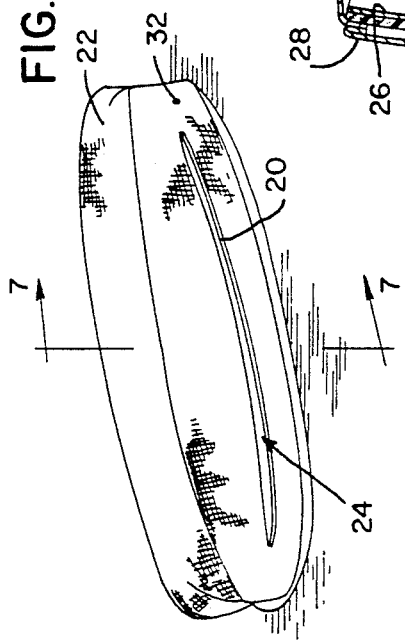
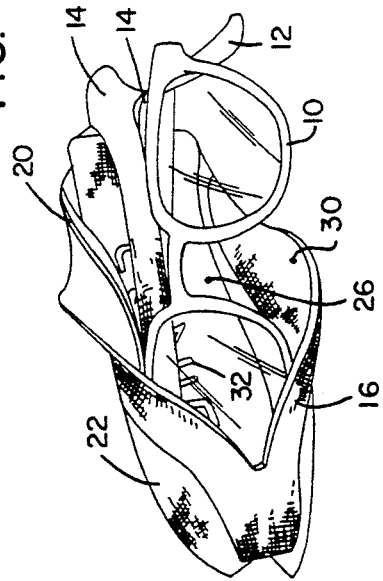
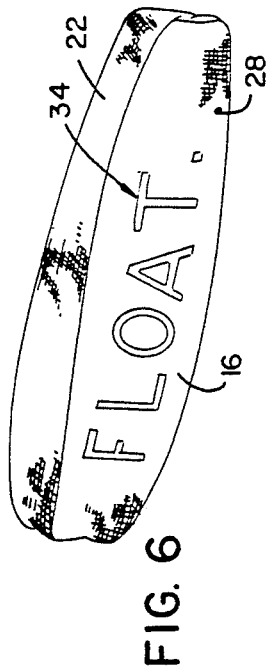
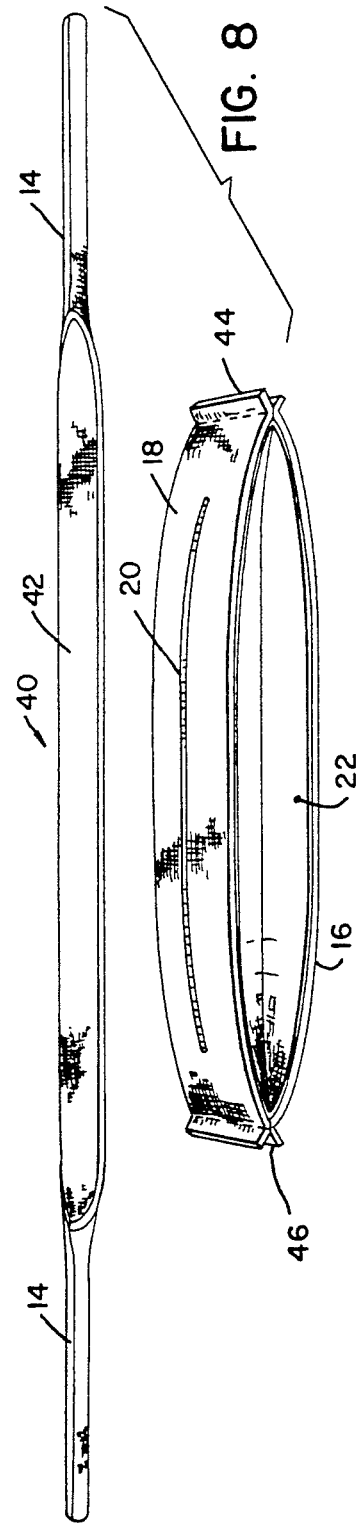

EYEGLASS CASE AND RETAINER

BACKGROUND OF THE INVENTION

1. Field of the Invention

The invention relates to retainers and cases for eyeglasses and is specifically related to a retainer comprising a head band that fits around the rear of the head and attaches to the bows of the glasses and can also serve as a case for protecting the glasses.

2. Description of the Prior Art

Various retainers and cases for eyeglasses have been advanced in the art. In particular, for sport activity, retainers for holding eyeglasses through the use of head band attached to the bows have gained widespread acceptance. These devices have worked well in many instances. In an example of a device of this nature is illustrated in U.S. Pat. No. 4,133,604 entitled EYEGLASS RETAINER issued to R. Fuller on Jan. 9, 1979.

Eyeglass cases are also well known in the art. Particularly, with respect to eyeglasses that are not necessarily worn at all times, it is desirable to place the eyeglasses in a case which is readily available to the user. For example, pocket cases and purse cases are well known and are ideally suited for carrying sunglasses and the like which are only worn on occasion.

With respect to water sports, it is desirable that the case and strap be floatable and, where possible, that the case and strap, when secured to the eyeglasses, permit the eyeglass case/retainer combination to float if dropped. Such a device would be ideally suited for active water sports such as water skiing and the like.

SUMMARY OF THE INVENTION

The subject invention is directed to a case for holding eyeglasses wherein the case includes an integral retainer having a pair of straps which may be secured to the bows or temples of the eyeglasses and the case forms a portion of the headband of the retainer. The case is adapted to receive the eyeglasses without removing them from the retainer band. In the preferred embodiment, the case is constructed of a floatable material and is adapted to float when attached to the eyeglasses, keeping the eyeglasses afloat in the event they are dropped in the water during water sport activities. The eyeglass case/retainer of the subject invention is ideally suited for water sport activities such as swimming, skiing, boating and the like wherein the glasses are protected against damage when not worn, will float if inadvertently dropped into the water. In addition, the invention functions as an ideal retainer for holding the eyeglasses on the head of the wearer during sport activities.

In the preferred embodiment of the invention, the case includes an elongate base made of a flexible material and having outer ends terminating in a pair of elongate straps which are adapted to be secured to the bows of the glasses. A flexible sheet or pad approximately the same shape as the base is attached to the underside of the base for forming a pocket between the base and the pad. An elongate slot in the sheet is adapted for receiving the eyeglasses when they are in the folded position, for enveloping the eyeglasses between the base and the sheet.

The straps may be made of a hollow tubular material adapted to receive and friction grip the bows. In the preferred embodiment, an expandable strip is disposed between the base and the sheet, to form an expandable pocket between the base and the sheet of the case in order that the case will receive and retain a large variety of eyeglass frames. The base, sheet and straps may be made of a floatable material, wherein the entire assembly including the eyeglasses would float when dropped in the water.

In its preferred form, the slot in the sheet is adapted to receive the base, whereby the case is turned inside out as the glasses are inserted through the slot. This makes the case ideal for containing one form of identifying indicia on the outside of the case and a second form of identifying indicia on the inside of the case, wherein the first indicia is exposed when the case is worn as a retainer and the second indicia exposed only when the eyeglasses are in the case and the case is turned inside out. This permits the use of varying logos and advertising messages on the opposite sides of the case, making the product ideally suited for promotional purposes, wherein an advertising message may be placed on one or the other sides of the case without interfering with the aesthetics.

The retainer straps may be an integral portion of the base or, in the alternative, may be a separate strap member having outer ends defining bow retaining straps and adapted to be placed in the pocket of the case with the straps extending through slots provided in the base to define a retainer and head band.

In the preferred form, the base and sheet defining the case are made of a floatable, flexible material such as, by way of example, neoprene rubber or the like. The expandable pocket strip may be formed of a similar material or, where desired, may be formed of a lighter weight nylon-type material such as lycra or the like.

It is, therefore, an object and feature of the subject invention to provide an eyeglass retainer wherein the head band of the retainer defines the eyeglass case for enveloping and protecting the eyeglasses when not in use.

It is yet another object and feature of the subject invention to provide for an eyeglass retainer and case wherein the entire assembly is floatable, including the eyeglasses secured to the retainer straps.

It is yet another object and feature of the subject invention to provide an aesthetically pleasing eyeglass retainer/case wherein the case serves as the head band of the eyeglass retainer when the eyeglasses are worn by the user.

Other objects and features of the invention will be readily apparent from the accompanying drawing and description of the preferred embodiment.

BRIEF DESCRIPTION OF THE DRAWINGS

FIG. 4 is a view similar to FIG. 3, showing the case being turned inside out to receive the eyeglasses and envelope the eyeglasses and straps in the case pocket.

FIG. 5 is a rear perspective view of the case/retainer with the eyeglasses enclosed in the case.

FIG. 6 is similar to FIG. 5 and shows the front perspective of the case.

FIG. 7 is a section view taken along lines 7—7 of FIG. 5.

FIG. 8 is an alternative embodiment, showing the unassembled pieces of a case/retainer assembly, in perspective.

DETAILED DESCRIPTION OF THE PREFERRED EMBODIMENT

Figure 1:
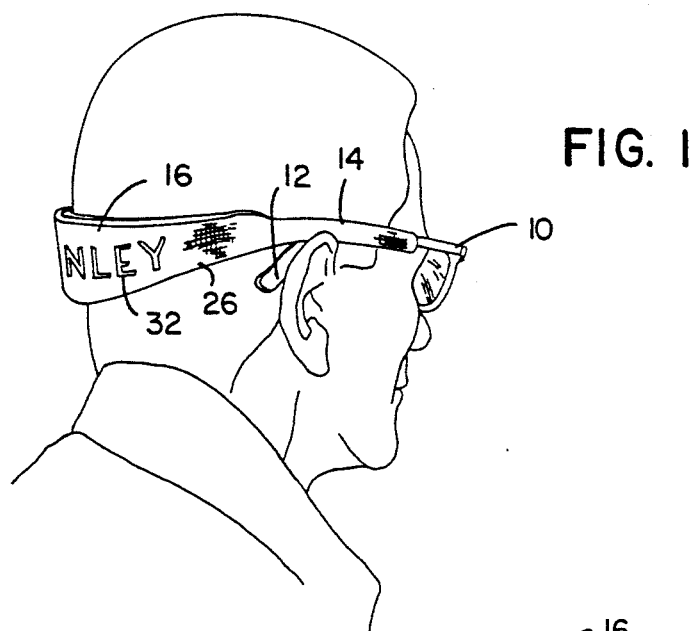
FIG. 1 is an illustration of the eyeglass case/retainer of the subject invention shown as worn by a user.

As shown in FIG. 1, the eyeglass case/retainer of the subject invention is adapted to be worn as a head band around the head of the wearer. A typical pair of eyeglasses 10 having bows 12 are adapted to be received in the hollow tubular strap 14 of the retainer. In the preferred embodiment, the straps are part of the base 16 of the assembly, the base being enlarged to provide a comfortable fit around the head of the wearer when in use. In the preferred embodiment, straps 14 and base 16 are of unitary construction and are made of a flexible, slightly expandable material such as neoprene rubber or the like. The tubular straps are formed from the flat neoprene strip and are adapted to receive and form a friction gripping action against the bows 12 of the eyeglasses. As the straps are stretched along their longitudinal axis, they contract to increase the friction grip on the bows, making the straps adjustable and removable when the eyeglasses are not worn, as in FIG. 2, but when slightly stretched to go over the head of the wearer, forming a tight grip making the retainer of the subject invention ideally suited for sports activities and the like.

Figure 2:
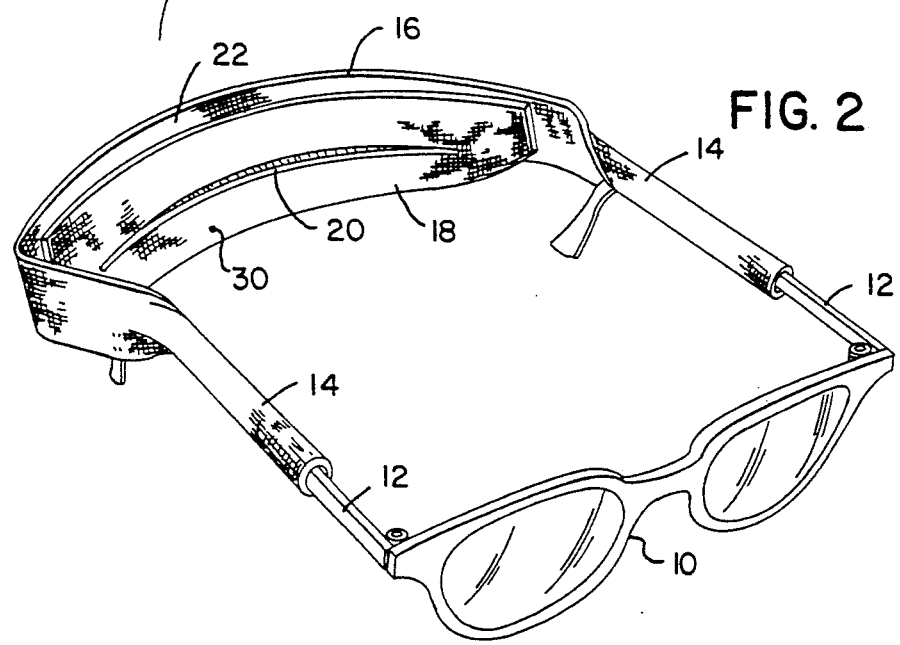
FIG. 2 is a perspective view of the eyeglass case/retainer of the subject invention with a pair of typical eyeglasses attached thereto, the eyeglasses shown in the open, as worn, position.

As shown in FIG. 2, a substantially flat, flexible sheet 18 is attached to the base 16 and is of a size and shape conforming substantially to the size and shape of the base 16. The perimeter or periphery of the sheet 18 is secured to the base 16. A through slot 20 is provided in the sheet 18 to provide access to the pocket defined between the base 16 and the sheet 18.

In the preferred embodiment of the invention, and as best shown in FIG. 7, a strip 22 of expandable material is interposed between the base 16 and the sheet 18. The outer edges of the strip 22 are secured to the perimeter of the base 16 and the perimeter of the sheet 18, respectively. This defines an expandable pocket 24 between the base and the sheet, permitting the case to accommodate a variety of frame styles and shapes.

Also, as shown in FIG. 7, the base 16 may be made of the neoprene rubber and the sheet 18 likewise with the neoprene rubber, making the assembly floatable and somewhat stretchable and flexible. In order to improve the aesthetics and durability of the assembly, it may be desirable to provide a cover material 26 over the outside of the base and a similar cover material 28 over the inside of the base. This material may conform to the strip material 22, to provide a pleasant, continuous aesthetic appearance. Likewise, the sheet 18 may include a cover material 30 on the outside and a cover material 32 on the inside to provide a pleasing appearance.

Figure 3:
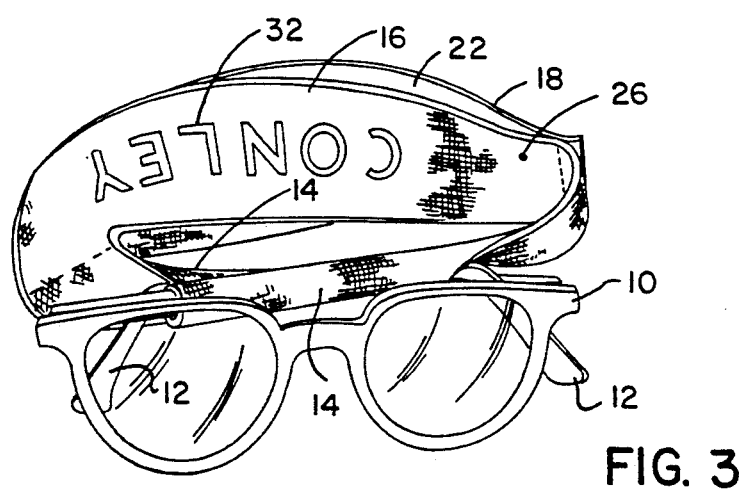
FIG. 3 is a perspective view of the assembly of FIG. 2, showing the eyeglasses in the folded position.

As shown in FIGS. 3-6, the case/retainer of the subject invention is turned inside out when removed from the head of the wearer and the eyeglasses are folded to be placed inside the pocket 24. As shown in FIG. 3, as the bows 12 of the eyeglasses are folded to the closed position, the straps 14 are folded in, permitting the outside surface 26 of the base 16 to be reversed, as shown in FIG. 3, wherein it is adjacent the eyeglass frame. The base 16 is then placed against the folded bows, in the position of FIG. 3, and then, as shown in FIG. 4, the sheet 18 is folded up over and down under the base, pulling the base through the slot 20, and pulling the eyeglasses 10 into the pocket between the base and the sheet, as the case is turned inside out, completely enclosing the eyeglasses in the pocket 24, as shown in FIGS. 5, 6 and 7.

The configuration of the invention is particularly well suited for promotional messages. As shown in FIGS. 1 and 3, the outside surface 26 of the base can include identifying indicia such as the term "CONLEY" 32. When the case is turned inside out as shown in FIGS. 4-7, the indicia 32 is inside the pocket 24. The underside 28 of the case is now exposed, as shown in FIGS. 6 and 7, permitting a second identifying indicia such as, by way of example, the term "FLOAT" 34. This permits a plurality of messages to be displayed on the case, wherein the first message 32 is exposed and visible when the case/retainer is in the "retainer" position, and is worn as shown in FIG. 1. The indicia 34 is only exposed after the case is turned inside out for retaining the eyeglasses.

An alternative embodiment of the invention is shown in FIG. 8. As there shown, the straps 14 may be constructed of an elongate strap strip 40 having a substantially flat mid section 42. In this embodiment, the base 16 would include a pair of through slots (not shown) adjacent its outer ends 44 and 46. The strap strips 14 are adapted to be threaded through the slots, with the flat mid section 42 of the strap strip 40 being disposed inside the pocket of the assembly. This permits adjustment of the base 16 for comfort when it is used as a head band and, where desired, permits the retainer strap 40 to be removed from the case assembly.

While certain features and embodiments of the invention having been described in detail herein, it would be readily understood that the invention encompasses all the modifications and enhancements within the scope and spirit of the following claims.

I claim:

1. A case for holding eyeglasses of the type having a frame including a bridge adapted to be placed on the nose of a wearer and a pair of bows hingedly connected to the frame and adapted to be moved between a folded position against the frame and an open position wherein the bows can be placed on the ears of the wearer, the eyeglass case comprising:
   a. an elongate base made of a flexible material and having a top side and an under side and an outer perimeter defined by spaced apart upper and lower edges and opposite end edges;
   b. a pair of elongate straps extending outwardly from the opposite end edges of the base, one each of said straps adapted to be releasably secured to one of the bows;
   c. a flexible sheet having a perimeter conforming substantially to the outer perimeter of the base and secured to the underside of the base about the sheet perimeter; and
   d. an elongate, through slot in said sheet adapted for receiving the eyeglasses when said bows are in the folded position for enveloping the eyeglasses between the base and said sheet.

2. The eyeglass case of claim 1, further comprising an expandable strip disposed between the base and the sheet and secured about the peripheries thereof for defining an expandable pocket between the base and the sheet.

3. The eyeglass case of claim 1, wherein the sheet is adapted to be placed against the back of the head of the wearer when the bows are in the open position and the eyeglasses are worn.

4. The eyeglass case of claim 1, wherein the straps are constructed of an expandable, hollow, tubular material adapted for receiving and friction gripping the bows.

5. The eyeglass case of claim 1, wherein the base and the sheet constructed of a neoprene rubber material.

6. The eyeglass case of claim 2, wherein the expandable strip is made of a nylon material.

7. The eyeglass case of claim 1, wherein the straps are an integral portion of the base and extend outwardly from the opposite end edges thereof.

8. The eyeglass case of claim 1, wherein the base includes a pair of substantially parallel through slots, one each adjacent and substantially parallel to each of the opposite end edges of the base, and wherein the straps comprise an elongate strap strip having a midsection and opposite, outer, strap defining ends, and wherein the midsection is disposed between the base and the sheet and the outer, strap defining ends are inserted through the parallel slots in the base.

9. The eyeglass case of claim 8, wherein the mid-section of the strap strip is substantially planar and lies against the base and wherein the strap defining ends of the strap strip are rolled to form hollow tubular straps adapted for receiving and gripping the bows of the eyeglasses.

10. The eyeglass case of claim 9, wherein the strap strip is constructed of a neoprene rubber material.

11. The eyeglass case of claim 1, wherein the top side of the base includes a first identifying indicia thereon and the underside of the base includes a second identifying indicia thereon.

12. The eyeglass case of claim 2, wherein when the bows are in the folded position the base is adapted to be inserted into the slot in the sheet, thereby turning the base inside out and encompassing the eyeglasses therein.

13. The eyeglass case of claim 12, wherein the base includes a first identifying indicia on the top side which is normally exposed and a second identifying indicia on the underside which is exposed when the base is turned inside out.

14. A floatable eyeglass case for encasing eyeglasses of the type having a frame including a bridge adapted to be placed on the nose of a wearer and a pair of bows hingedly connected to the frame and adapted to be moved between a folded position against the frame and an open position wherein the bows can be placed on the ears of the wearer, the floatable eyeglass case comprising:

a. an elongate, flexible, floatable base having a top side and an under side and an outer perimeter defined by spaced apart upper and lower edges and opposite end edges;

b. a pair of elongate straps extending outwardly from the opposite end edges of the base, one each of said straps adapted to be secured to one of the bows; and c. an elongate, flexible sheet having a perimeter conforming substantially to the base perimeter and being secured about the common perimeters to the underside of base, the sheet including a through slot substantially spanning the opposite end edges of the base, whereby the base can be folded into the slot for turning the case inside out when the bows of the eyeglasses are in the folded position, thereby encasing the eyeglasses between the base and the sheet.

15. The floatable eyeglass case of claim 14, further comprising an expandable strip disposed between the base and the sheet and secured about the peripheries thereof for defining an expandable pocket between the base and the sheet.

16. The floatable eyeglass case of claim 14, wherein the straps are constructed of a hollow, expandable, tubular material adapted for receiving and friction gripping the bows.

17. The floatable eyeglass case of claim 14, wherein the base includes a first identifying indicia on the top side which is normally exposed and a second identifying indicia on the underside which is only exposed when the base is turned inside out.

* * * * *